(No Model.)
D. W. FERGUSON.
DEVICE FOR SUPPORTING BICYCLE OR OTHER WHEELS DURING CONSTRUCTION OR REPAIR.
No. 566,851. Patented Sept. 1, 1896.
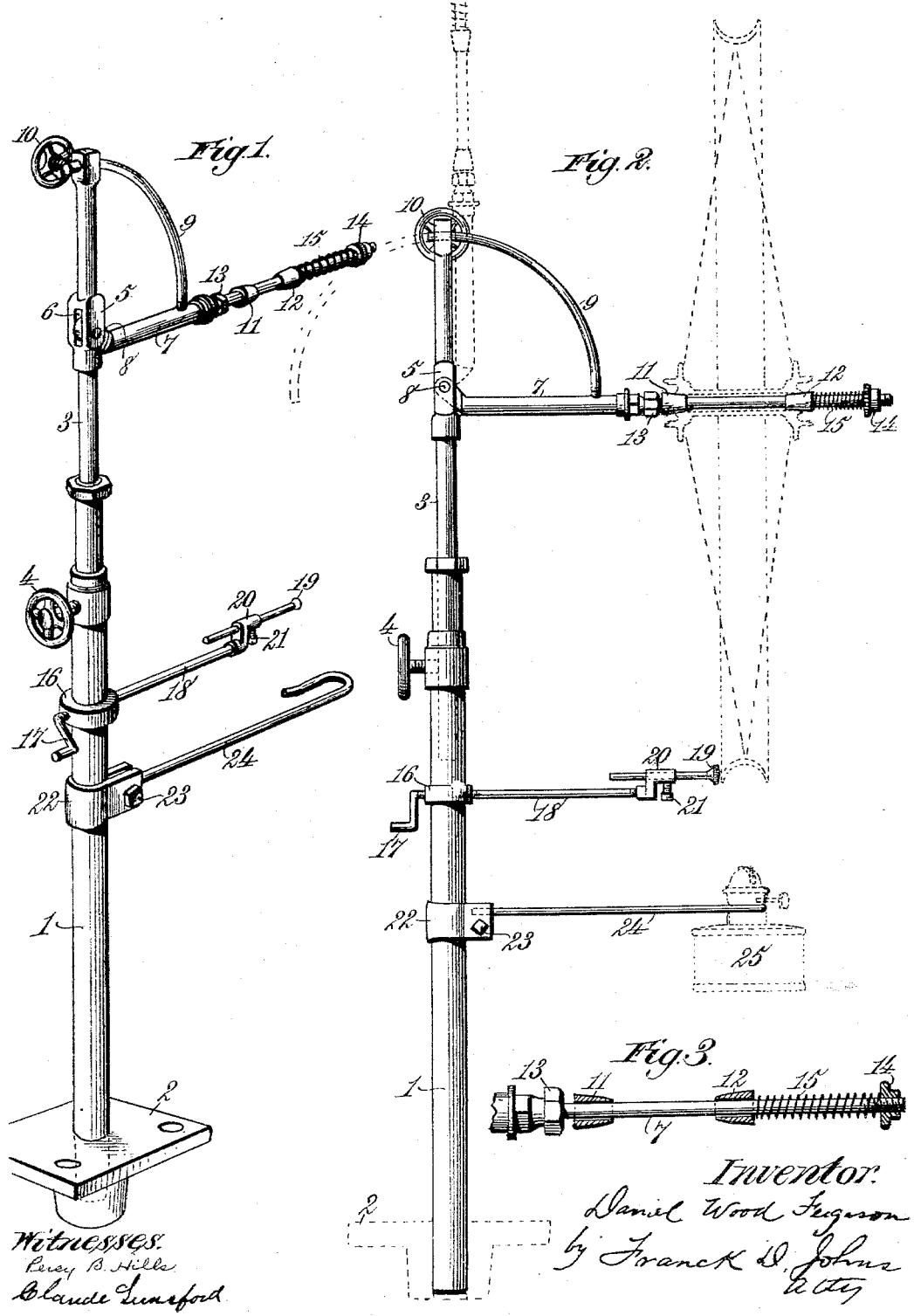
Witnesses.
Percy B. Hills
Claude Lunsford
Inventor:
Daniel Wood Ferguson
by Franck D. Johns
Atty

UNITED STATES PATENT OFFICE.

DANIEL WOOD FERGUSON, OF GREELEY, IOWA.

DEVICE FOR SUPPORTING BICYCLE OR OTHER WHEELS DURING CONSTRUCTION OR REPAIR.

SPECIFICATION forming part of Letters Patent No. 566,851, dated September 1, 1896.

Application filed November 14, 1895. Serial No. 568,957. (No model.)

*To all whom it may concern:*

Be it known that I, DANIEL WOOD FERGUSON, a citizen of the United States, residing at Greeley, in the county of Delaware and State of Iowa, have invented certain new and useful Improvements in Devices for Supporting Bicycle or other Wheels during Construction or Repair; and I do hereby declare the following to be a full, clear, and exact description of the invention, such as will enable others skilled in the art to which it appertains to make and use the same.

My invention relates to devices for temporarily supporting the wheels of vehicles of any size, more particularly those of bicycles and tricycles, during their construction or repair, and has for its object to provide a new and improved support upon which the wheel may be rotatably mounted on its hub and may be carried thereby either vertically, horizontally, or at any intermediate angle.

A further object of my invention is to provide an adjustable gage on said support for accurately determining whether the rim of the wheel is true on its hub.

A still further object is to provide an adjustable lamp or gas bracket for heating the rim of the wheel when it is desired to place a rubber tire thereon or for any other purpose. These objects I accomplish in the manner and by the means hereinafter described and claimed, reference being had to the accompanying drawings, in which—

Figure 1 is a perspective view of my improved device. Fig. 2 is a side elevation with a wheel shown thereon in dotted lines. Fig. 3 is a detail sectional view of the hub-supporting shaft.

In the said drawings, the reference-numeral 1 denotes a hollow standard supported at its lower end in a suitable base 2, the latter being provided with screw-holes to fasten it to the floor, or, if desired, the base 2 may be mounted on casters, in which event it will be made sufficiently heavy to properly support the device.

Vertically movable in the upper end of the standard 1 is a second telescopic standard 3, adapted to be retained in any adjustment by a suitable screw 4, tapped through the standard 1 and having its inner end adapted to engage with the side of the standard 3.

The standard 3 is provided with an enlarged portion 5 near its upper end, which is slotted at 6 to receive the slightly-curved end of a shaft 7, pivoted therein by the pivot-pin 8. By slightly curving the lower end of said shaft 7 the latter is permitted to assume a vertical position alongside the standard 3, as well as to be turned down to a horizontal position. A rod 9, curved in the arc of a circle, is fixed to said shaft and passes loosely through an aperture in the extreme upper end of the standard 3, where it is retained in any adjusted position by the set-screw 10. This construction permits the shaft 7 to be retained in a vertical or horizontal position or at any intermediate angle.

Mounted loosely upon the outer end of the shaft 7 and longitudinally movable thereon are the two cones 11 and 12, adapted to form a rotating bearing for the wheel-hub. A nut 13 or other obstruction limits their inward movement, while a removable screw-nut 14 permits the removal of the outer cone to admit the insertion of the hub. After the hub is placed on the shaft the outer cone 12 is replaced and the nut 14 screwed on, a coiled spring 15 being preferably interposed between said nut and cone, as shown, to press the outer cone 12 firmly into the wheel-hub and retain the parts in position against longitudinal displacement. If desired, however, the spring 15 may be dispensed with and the nut 14 screwed up against the outer cone 12.

Encircling the standard 1, below the set-screw 4, is a collar 16, longitudinally movable on said standard and adapted to be retained in any desired position by the thumb-screw 17, tapped thereinto. This collar has projecting horizontally therefrom a rod 18, carrying at its outer end a gage 19 for determining whether the wheel on the shaft 7 is true or not. This gage is horizontally adjustable in a suitable bearing 20 on the end of the rod 17 and is retained in any adjusted position by the screw 21. If desired, however, the bearing 20 may be dispensed with and the gage 19 made adjustable on the rod 18 in any other suitable manner. Also mounted on the standard 1 and below the collar 16 is another collar 22, having its free ends adapted to be brought together by the screw-bolt 23 to clamp the same in any adjusted position on the standard 1. This collar has projecting horizontally therefrom a bracket 24, adapted to support a lamp 25 for heating the rim of the wheel when it is desired to apply thereto a rubber tire, or for any other purpose.

The operation of my device will now be understood to be as follows: The hub of the wheel to be assembled or repaired is mounted on the cones 11 and 12 on the shaft 7 and clamped thereon by means of the nut 14 and spring 15. The standard 3 may now be adjusted vertically to suit the operator and clamped by the set-screw 4, while the angle at which the shaft 7 and its supported wheel-hub is held can be changed by means of the rod 9 and set-screw 10. The hub may now be rotated on the cones 11 and 12 when desired by the operator to bring any part of it into position to be worked on. When the wheel is assembled or repaired, the shaft 7 may be turned to a horizontal position, which will bring the wheel to a vertical position, and the collar 16, adjusted on the standard 1, to bring the gage 19, carried thereby, against the wheel-rim and in contact therewith, as shown. Now by rotating said wheel it can be readily ascertained whether or not the rim is true thereon.

When it is desired to heat the rim for any purpose, the rod 18 may be turned out of the way and the collar 22, carrying lamp 25, may be brought up beneath said rim in position to heat the same.

If desired, a gas-jet may be carried by the bracket 24 instead of a lamp, a flexible gas-conveying tube being connected to said jet.

By employing the telescopic standards 1 and 3 and the hub-supporting shaft 7, movable in the arc of a circle, a universal adjustment is permitted to the supported wheel-hub.

Having thus described my invention, what I claim is—

1. A wheel-hub-supporting device, consisting of a vertically-adjustable standard, and a hub-supporting shaft carried thereby and adjustable in the arc of a circle from a vertical to a horizontal position, substantially as shown and described.

2. A wheel-hub-supporting device, consisting of two vertical standards, one telescoping within the other, a hub-supporting shaft pivoted in the upper standard and adjustable in the arc of a circle from a vertical to a horizontal position, and means for retaining said shaft in any adjusted position, substantially as shown and described.

3. A wheel-hub-supporting device, consisting of a vertical standard, a hub-supporting shaft pivoted in said standard and adjustable in the arc of a circle from a vertical to a horizontal position, a curved rod connected to said shaft and passing freely through an aperture in the vertical standard, and means for clamping said rod at any point to retain the shaft in any adjusted position, substantially as shown and described.

4. A wheel-hub-supporting device, consisting of a shaft, means for adjusting the same vertically and in the arc of a circle from a horizontal to a vertical position, in combination with two cones rotatably mounted on said shaft and adapted to support a wheel-hub therebetween, and a removable nut for retaining said cones in position against longitudinal movement on said shaft, substantially as shown and described.

5. A wheel-hub-supporting device, consisting of a shaft, means for adjusting the same vertically and in the arc of a circle from a horizontal to a vertical position, in combination with two cones rotatably mounted on said shaft and adapted to support a wheel-hub therebetween, a removable nut on the end of said shaft, and a coiled spring interposed between said nut and the outer cone to retain said cone and the wheel-hub against longitudinal movement on the shaft, substantially as shown and described.

6. The combination with two vertical standards, one telescoping within the other, and means for rotatably supporting a wheel from the upper standard in a vertical position, of a collar mounted on the lower standard and vertically adjustable thereon, and a gage supported from said collar and adjustable to and from the same and adapted to contact with the wheel-rim for gaging the trueness of the same during its rotation, substantially as shown and described.

In testimony whereof I affix my signature in presence of two witnesses.

DANIEL WOOD FERGUSON.

Witnesses:
SAMUEL B. SLOAN,
HENRY BOX.